United States Patent [19]

Wagner et al.

[11] 4,165,625
[45] Aug. 28, 1979

[54] DEVICE FOR EXTRUDING SECTIONS FROM AN INGOT

[75] Inventors: Alfred Wagner, Steisslingen; Adolf Ames, Hilzingen-Duchtlingen; Karl Graf, Singen, all of Fed. Rep. of Germany

[73] Assignee: Swiss Aluminium Ltd., Chippis, Switzerland

[21] Appl. No.: 846,635

[22] Filed: Oct. 31, 1977

[30] Foreign Application Priority Data

Nov. 11, 1976 [DE] Fed. Rep. of Germany ....... 2651564

[51] Int. Cl.² ............... B21C 25/02; B21C 26/00; B21C 27/04; B23D 1/00
[52] U.S. Cl. ............................................. 72/38; 72/40; 72/254; 72/255; 72/256; 72/253 A; 72/273; 409/298
[58] Field of Search ................. 72/253, 254, 255, 256, 72/273, 38, 39, 40; 90/24 R

[56] References Cited

U.S. PATENT DOCUMENTS

| 2,638,818 | 5/1953 | Stevens | 90/24 |
| 2,688,400 | 9/1954 | Ansel | 72/254 |
| 3,015,995 | 1/1962 | Fahy | 90/24 |
| 3,132,564 | 5/1964 | Lindemann | 90/24 |
| 3,187,531 | 6/1965 | Cairns | 72/254 |
| 3,577,759 | 5/1971 | Tandler | 72/254 |
| 4,028,795 | 6/1977 | Takahashi | 72/263 |
| 4,033,024 | 7/1977 | Takahashi | 72/253 R |
| 4,050,142 | 9/1977 | Takahashi | 72/256 |
| 4,052,877 | 10/1977 | Zilges et al. | 72/253 A |

FOREIGN PATENT DOCUMENTS

| 1027167 | 4/1958 | Fed. Rep. of Germany | 72/38 |
| 1124455 | 3/1962 | Fed. Rep. of Germany | 72/38 |
| 1127305 | 4/1962 | Fed. Rep. of Germany | 72/253 |
| 2511296 | 9/1976 | Fed. Rep. of Germany | 72/255 |
| 1015185 | 12/1965 | United Kingdom | 72/253 |
| 332877 | 8/1972 | U.S.S.R. | 72/253 |
| 459280 | 3/1975 | U.S.S.R. | 72/254 |

*Primary Examiner*—Francis S. Husar
*Assistant Examiner*—D. M. Gurley
*Attorney, Agent, or Firm*—Bachman and LaPointe

[57] ABSTRACT

A device for extruding ingots, in particular for extruding light metal ingots through a shaping die placed downstream of the ingot, is provided with a scalping facility for removing an outer layer of the ingot immediately prior to extrusion. The said scalping facility is made up of a plurality of blades or similar scalping facilities which together form a scalping ring and can be moved radially with respect to the direction of extrusion, and can be released from the ingot.

9 Claims, 10 Drawing Figures

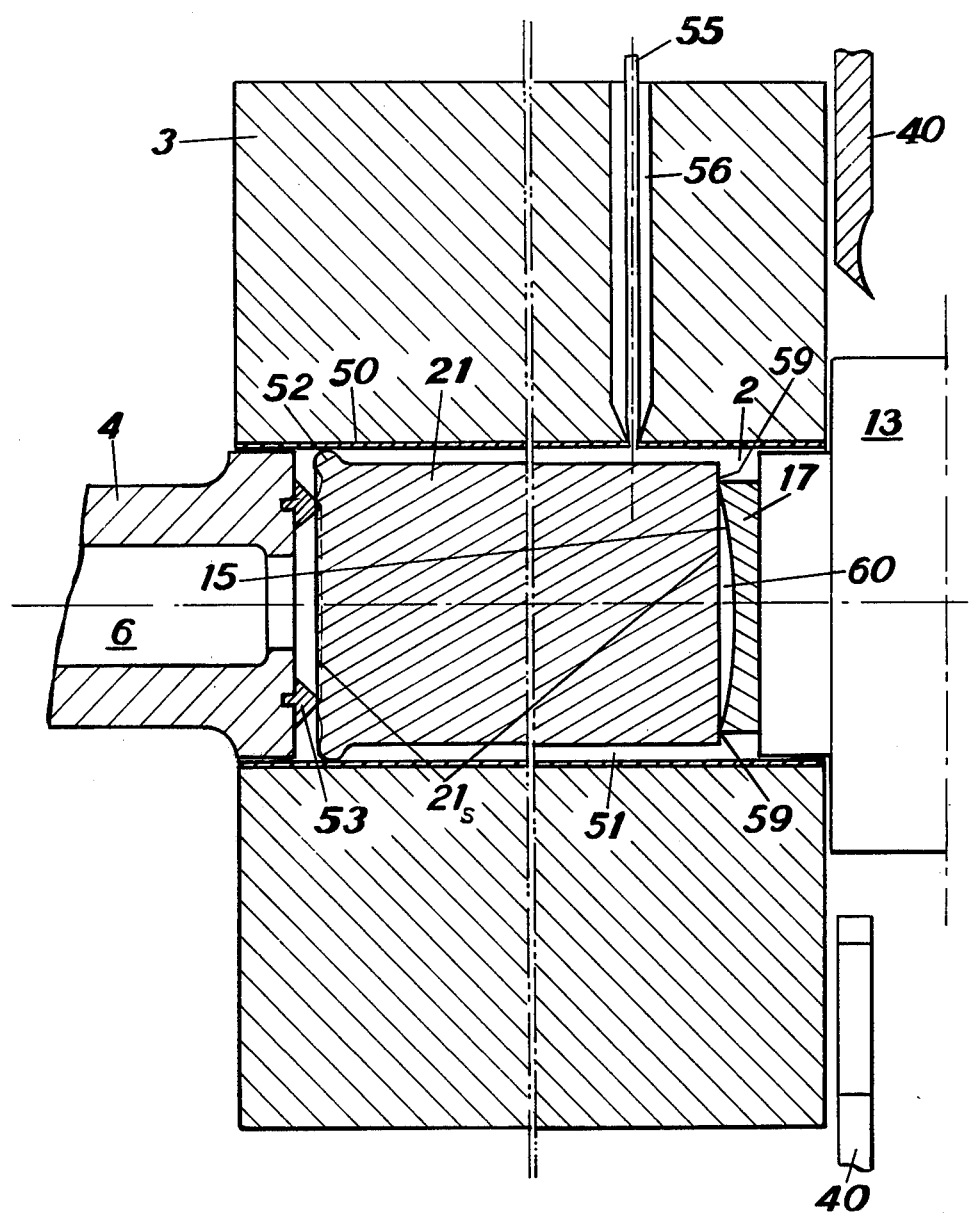

DEVICE FOR EXTRUDING SECTIONS FROM AN INGOT

BACKGROUND OF THE INVENTION

The present invention concerns a device for extruding sections from an ingot, in particular from a light metal extrusion ingot, by means of an extrusion die placed downstream from a container, whereby in front of the container i.e., upstream from it there is provided a tool for scalping the ingot, to remove its outer layer.

In hot forming an extrusion ingot, which has been heated to the extrusion temperature to shape it into elongated shapes or rods, the ingot which is normally surrounded by the container is pushed by the extrusion ram of a hydraulic press through the shaping tool or die. Whilst in the case of direct extrusion the container holding the ingot is moved towards the stationary die, in the so called indirect extrusion process the shape giving die is pushed into the fixed, stationary container. The die is situated at one end of a long stem which is both thermally and mechanically stressed; this stem is hollow since the extrusion formed passes out of the press through it.

Both with direct and indirect extrusion, difficulties arise due to segregation of elements in the ingot, impurities at the surface of the ingot and also to poor positioning of the ingot in the container. Furthermore, an oxide skin is formed due to oxidation of the ingot surface. In order to eliminate this a device was developed for the extrusion of metals and employs a cutting edge which is supported on a ring-shaped knife at the entry end to the container. During the charging of the ingot into the container, the stationary knife edge removes the surface layer of the ingot. The resultant ring of shavings is removed by means of blades specially employed for this purpose. It has however been found to be disadvantageous that a cutting edge of this kind involves considerable expense, and that its maintainance presents difficulties; also the scalping process can be carried out only at the expense of a considerable amount of time.

With this in mind the inventor set himself the task of improving a device of the kind described hereinabove and developing an economically attractive and time-saving scalping blade which scalps the surface of the ingot and also prevents the formation of an oxide skin between the scalping and extruding operations. Furthermore it should be possible to achieve an exact fit of the ingot diameter with respect to the inner diameter of the container.

SUMMARY OF THE INVENTION

This object is achieved by way of the present invention in that the scalping tool is made up of a plurality of cutting or similar scalping devices which can be moved in directions radial to that of extrusion and which combine to form a ring which can encircle the ingot. Furthermore, the cutting or scalping devices should form the radially removable scalping ring just in front of the entrance of the container which receives and holds the ingot.

Thanks to the foregoing impure ingot surface can be removed without great effort or expense, and also the scalping tool makes it possible to bring the ingot diameter to the correct size at which it fits the container.

The scalping tool is preferably provided at the end of the container away from the shaping die i.e., the ingot to be placed at this end of the container is led—either in the same or counter direction to that of extrusion—past the scalping tool and enters the container immediately after the scalping operation.

It is also within the scope of the present invention that a scalping tool is provided which is placed at the end of the container adjacent the shaping die and which scalps the ingot during this front end loading of the ingot and does so either while stationary or while moving in the direction of extrusion.

The ingot can therefore, in accordance with the present invention, move past the scalping tool or the scalping tool can be passed with the container over the stationary ingot. For this purpose the container is moved over the stationary stem and the ingot held firmly between the extrusion stem and a pressure plate, whereby the container and scalping tool move over the stem and on to the ingot. The advantage of this arrangement is the very short time required in loading the extrusion press, and for the scalping process of the invention no extra time is required.

The blades of the cutting tool are preferably curved in the form of parts of a circle around the axis of the container bore, and the flanks of the tool support each other during the scalping operation thus providing the scalping ring with good stability during the scalping operation.

If the blades of the cutting tool are tilted or bent slightly away from the container then they cause the ring of shavings from the scalping operation to break up in a very simple manner, this eliminates the need for additional tool components and also does away with time-consuming cleaning operations.

Particularly advantageous is the possibility of setting the scalping ring diameter such that it matches the inside circumference of the container; dimensional inaccuracies in the ingot size can therefore be compensated for in this simple way.

The scalping ring in accordance with the present invention moves with the container over the ingot until the pressure plate indicates the end of the scalping operation. The cutting tool is then withdrawn radially from the ingot.

In order that the cutting tools will not be damaged on withdrawing from the ingot, and to allow scalping of the ingot right up to its end, the diameter of the pressure plate is made to be smaller than the diameter of the ingot.

In addition the pressure plate—and if necessary also the facing end of the shaping die—is provided with projecting stops to deform the end face of the ingot. Instead of such stops, the pressure plate or die face in question can also be provided with a depression, the edge of which in accordance with the invention deforms the end face of the ingot at its edge as the pressure increases, until that part of the ingot fits against the inner wall of the container.

The deformation of the ingot edges is necessary since experience shows that between the ingot and the container there usually remains an annular space and even though this may be only very small, it is undesirable for the extrusion process itself. The air in the annular space leads in time to complications during extrusion, in particular to oxidation processes. In order to counteract this, the container is provided with a device for removing the air from between the ingot and the container; this device can also be used to introduce an inert gas as a further measure against oxidation processes.

Further advantages, features and details of the invention are revealed in the following description of preferred embodiments and with the aid of the schematic drawings.

BRIEF DESCRIPTION OF THE DRAWINGS

FIG. 10 is the section shown in FIG. 6 before extruding the ingot in a further version of the extrusion press.

Figure 1:
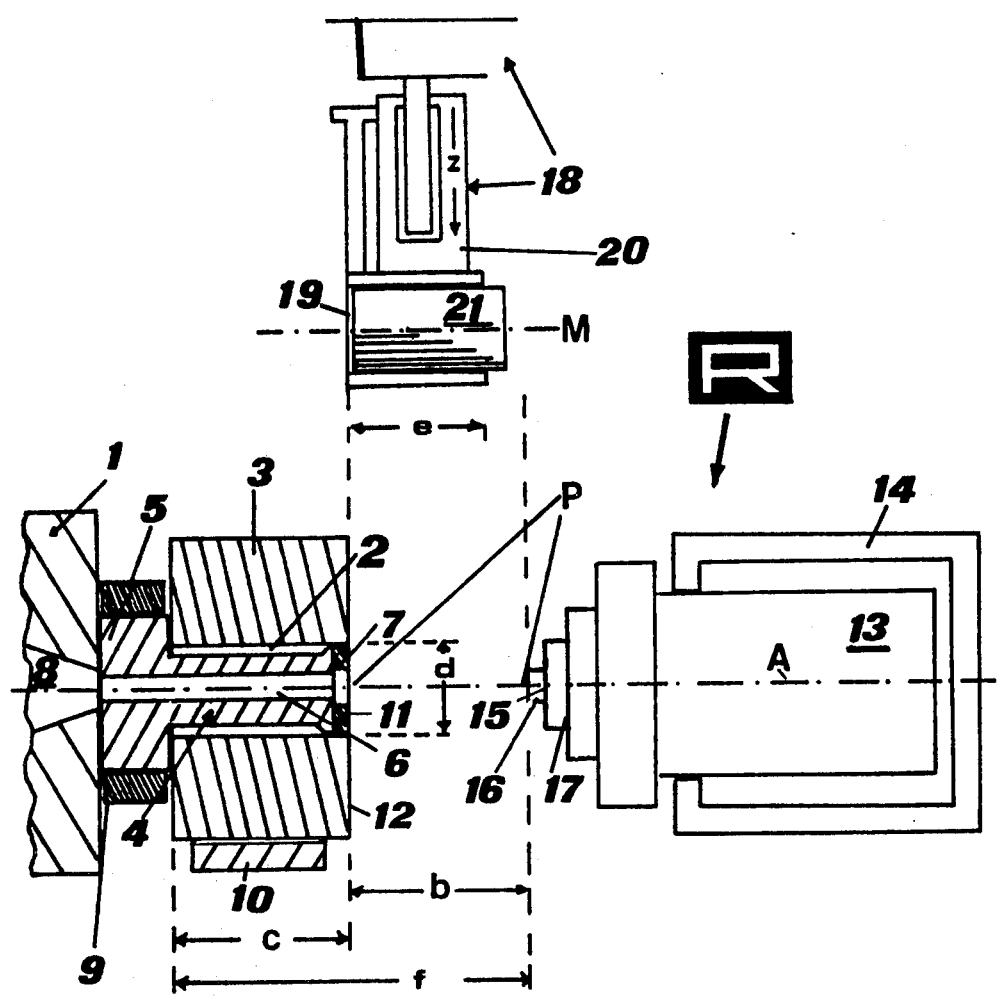
FIG. 1 is a plan view of a partially sectioned extrusion press at rest and with side loading ingot charging facility.

In the chosen examples the container 3 is freed from the platen 1 of a press R for the extrusion of aluminum sections, so that extrusion can be carried out via the so called indirect extrusion method.

Because the container 3 has a hollow centre 2, which is coaxial with the main axis A of the press R, it can be passed over the fixed stationary stem 4 the head 5 of which butts on to the platen 1.

The stem 4 has a central channel 6 which stretches from a shaping die 7 (details of which can not be seen in the drawing) to the opening 8 in the platen 1. The container 3, which is movable in the direction of the press axis A by means of a device 10, is pushed on to the stem 4 which is held on a die slide 9.

The main ram 13 in its stands 14 is shown facing the die face 11 on the side 12 of the container 3 away from the platen 1.

Figure 3:
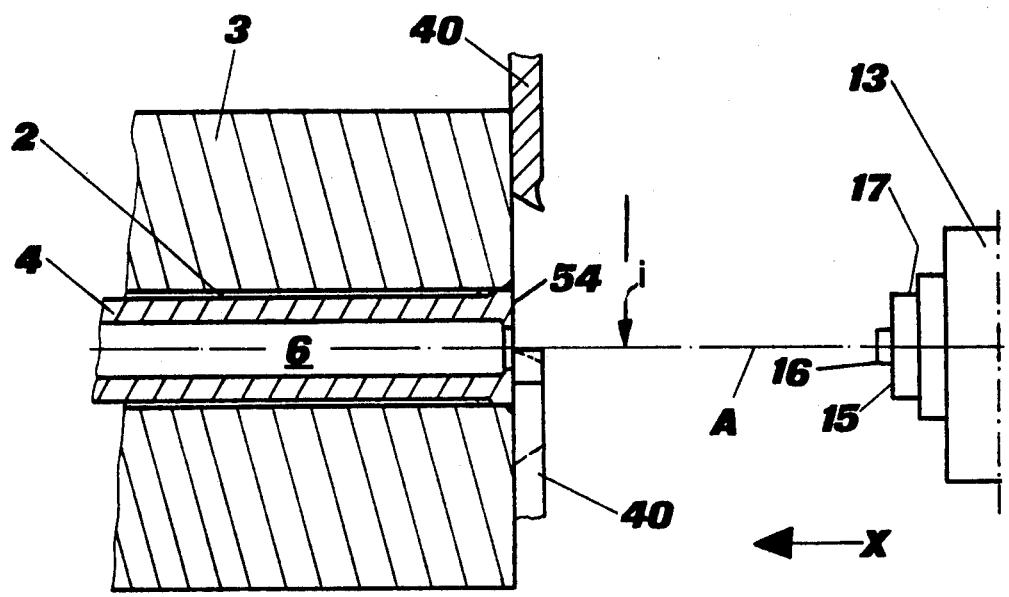
FIG. 3 is an enlarged section from FIG. 1 for a different version of the extrusion press.

During the loading stage, as shown in FIGS. 1,3, the width b of the gap P between the face 11 of the die and the opposite work-face 15 of the main ram 13 is the same as the length c of the container 3, so that the distance f of the maximum distance moved by the container 3 is not much greater than twice its length c; here this amounts to about four times the inner diameter d of the hollow centre 2 of the container 3. A change in the ratio of dimension is of no consequence.

A cylindrical projection 16 which juts out from the closing plate 17 of the main ram 13 serves as the pressure plate 15 of the main ram 13.

An ingot loading facility 18 is provided at the side of the press R at a distance from the main axis A. A cylindrical ingot 21 is lying in the concave load carrying surface 19 of a charging device 20 of breadth e which is part of the loading facility 18 and can be moved in a direction transverse to the main axis A.

Figure 2:
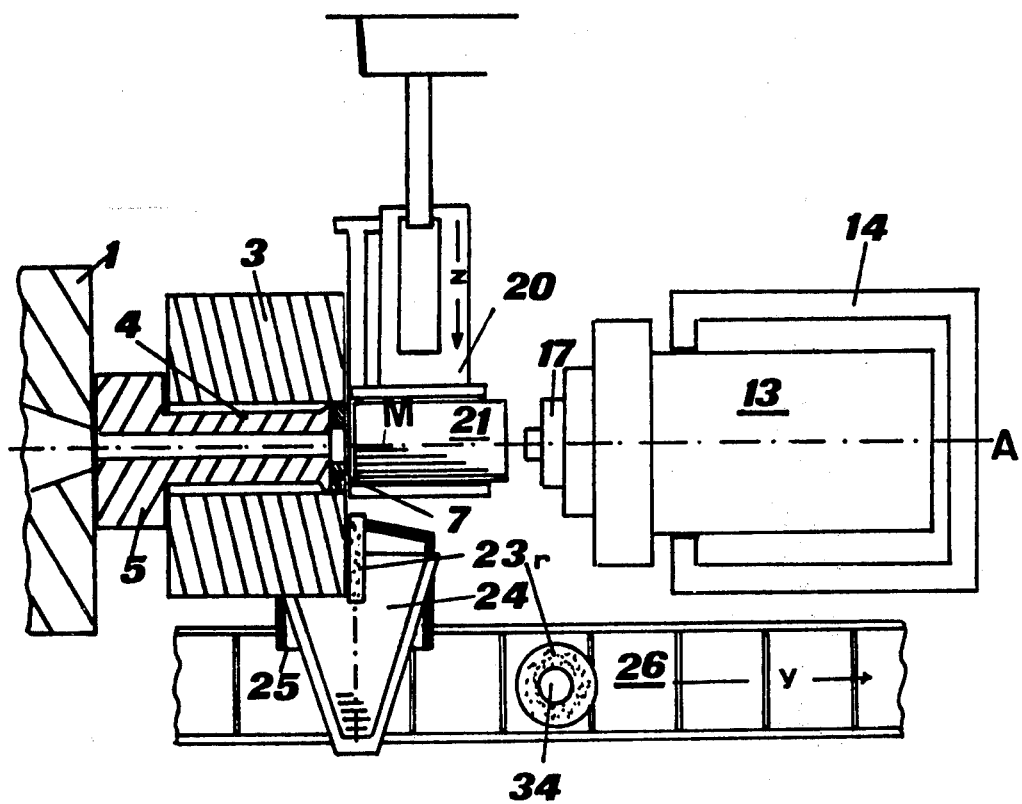
FIG. 2 is a extrusion press, prior to extrusion, with ingot loaded in place.

To load the press R with the ingot 21 the charging device 20 of the loading facility 18 is moved in the direction z until the axis M of the ingot 21 is in line with the main axis A of the press R (FIG. 2).

The force of the charging device 20 sliding in the direction Z causes the butt end 23 at the end 12 of the container 3 and originating from the previous extrusion event to be pushed from the container bore 2 whereupon it falls into the bin 24. Instead of that, the ingot butt 23—in another version of the extrusion press R—can be intercepted by a sliding mechanism 25 and led off to a conveyor 26 moving in the direction y.

When the ingot 21 has been placed in line in front of the opening 2 to the container 3 by the loading facility 18, the main ram 13 moves its pressure plate 15 against the ingot 21 and presses it against the die 7; the ingot 21 is then held suspended by the die 7 and the main ram 13.

Before pushing the ingot 21 into the container 3, the charging device 20 is withdrawn from the gap P; at the same time three cutting tools 40 which are positioned radially with respect to the main axis A of the press, and each having a scalping blade 41 in the shape of an arc of a circle, move forwards in the direction i towards the ingot 21 until the blades 41 are between the ingot 21 and container 3.

Figure 5:
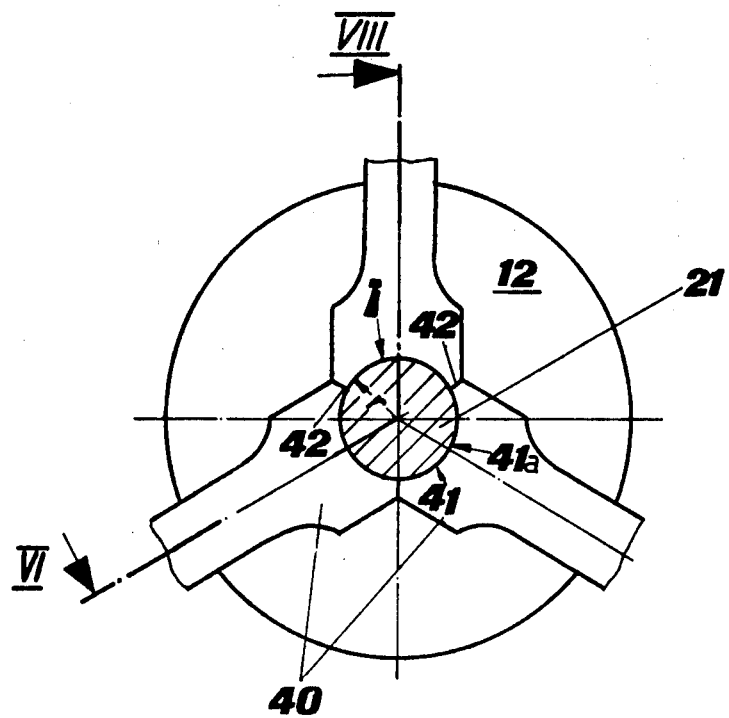
FIG. 5 is a front view during further stages of the process.

FIG. 5 in particular shows that each blade 41 comprises a third of a circle of radius r; the ends 42 of the blades 41 run in a radial direction and the neighbouring blade ends 42 come together in the scalping position shown in FIG. 5 in such a way that the blades 41 form a scalping ring 41a around the ingot 21.

The container 3 then moves in the direction y over the ingot 21 without touching it, and continues until its face 12 lies close to the closing plate 17 of the main ram 13.

Figure 6:
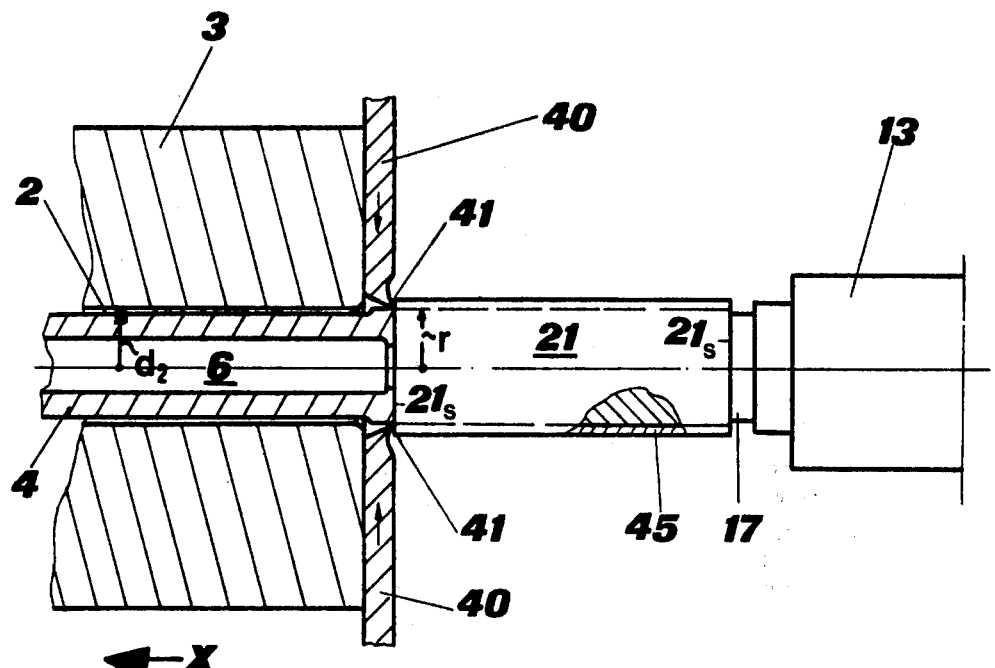
FIG. 6 is the section shown in FIG. 3 during a process step in accordance with FIG. 5, sectioned along the lines VI-VIII.
Figure 7:
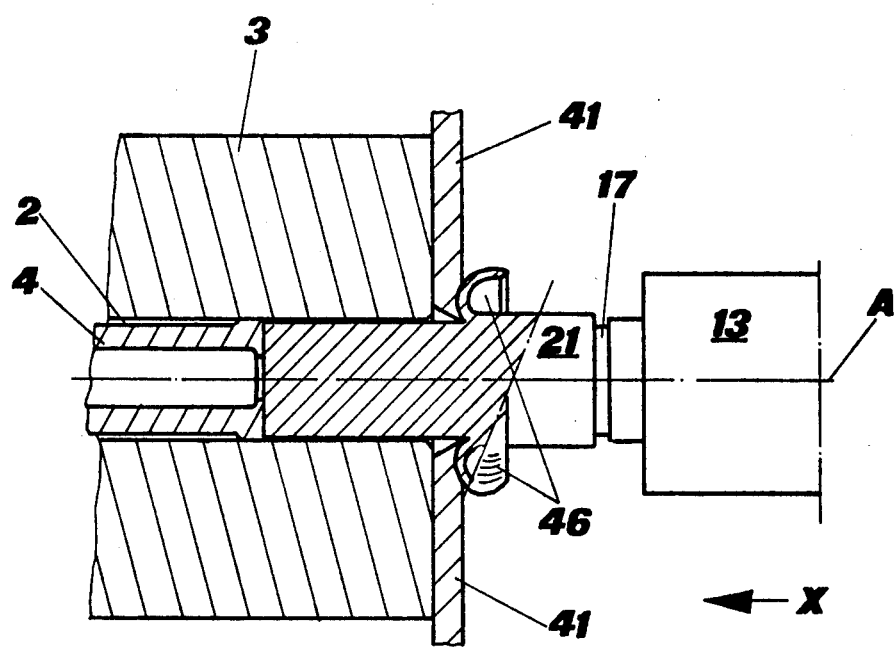
FIG. 7 is the section shown in FIG. 6 but with the cutting tools engaging the ingot.
Figure 8:
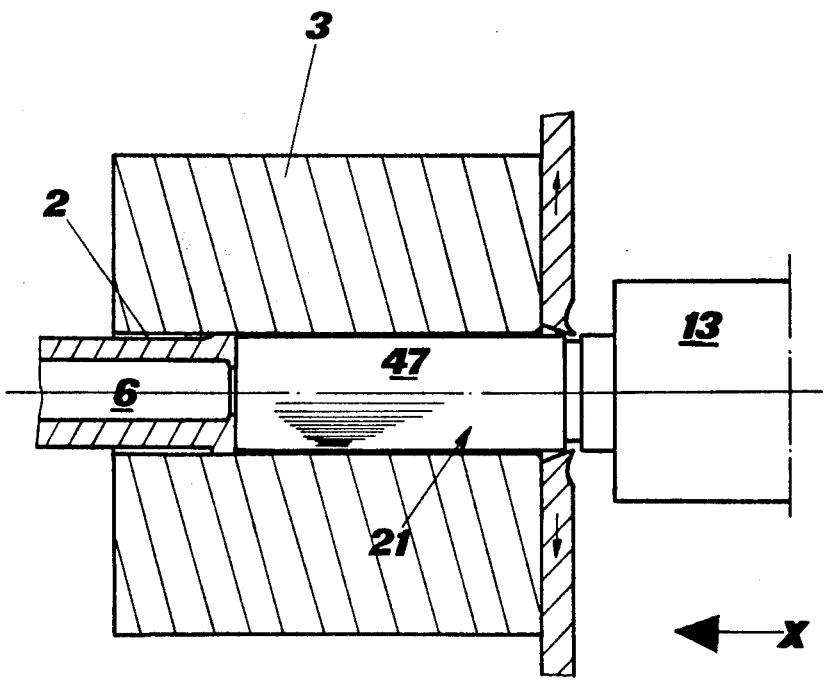
FIG. 8 is the section shown in FIG. 6 at the end of the scalping process.

As the ingot 21 enters container 3 the impure ingot skin is removed by the scalping ring 41a—indicated by 45 in FIG. 6—and forms a ring of shavings 46 (FIG. 7); this ring 46 is removed from the ingot 21 by the blades 41. The result is an ingot 21 with a clean surface and of radius r which corresponds closely to the radius $d_2$ of the bore 2 of the container 3; a residual space 51 is shown in FIG. 9 as being formed between the surface 47 of the ingot 21 and a film of aluminum lining the bore 2 of the container 3 or container lining 50.

Figure 4:
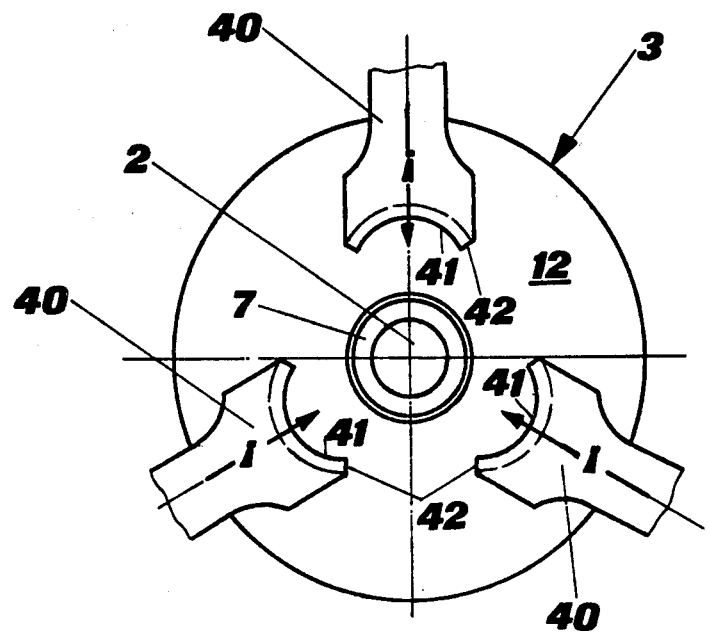
FIG. 4 is a non-sectioned front view of a detail from FIG. 3 looking in the direction of the arrow x and with three cutting tools.

As soon as the blades 41 reach the closing plate 17 of the main ram 13, the cutting tools 40 are drawn back into their starting position (FIG. 4); the container moves up to the closing plate 17 and the press R is loaded for extrusion.

Figure 9:
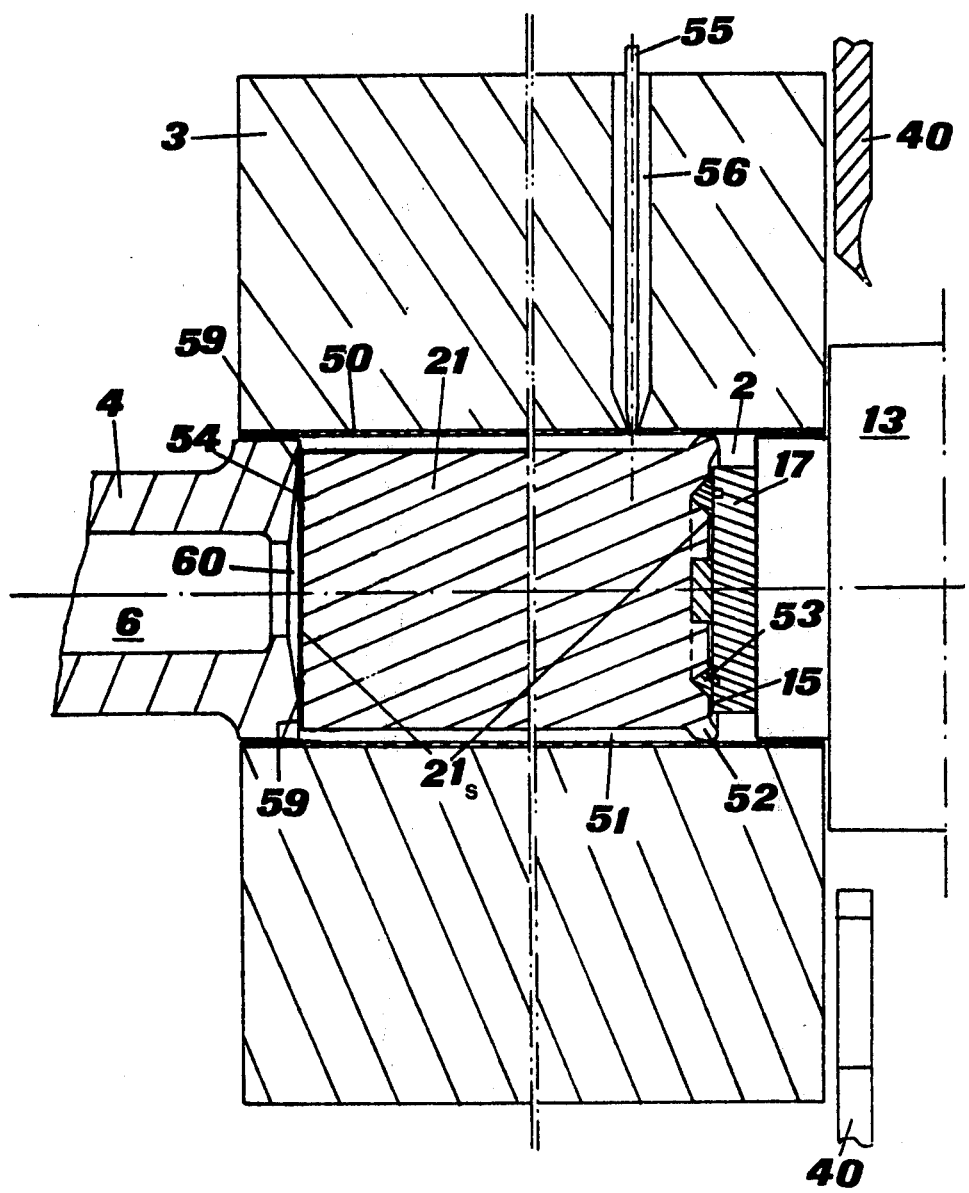
FIG. 9 is the section shown in FIG. 6 before extruding the ingot in another version of the extrusion press.

On pushing the ingot 21 into the bore 2 of the container 3 the end faces $21_s$ of the ingot 21 are deformed so that the outward bulging edges 52 are intimately in contact with the lining 50 in the container bore 2 (FIG. 9). This deformation is produced either via ring-like or arc shaped penetrating projections 53 on the work faces 15 or 54 of the closing plate 17 or stem 4 respectively or else—as shown in the left hand side of the version shown in FIG. 9—via the provision of a central, somewhat conical depression 60 in the work face 54; the edge 59 of that depression 60 deforms the end face of the ingot 21 with increasing pressure into an outward pointing bulge 52 (shown before deformation in FIG. 9).

Before the start of the actual extrusion operation, the container lining 50 is penetrated by at least one radial rod 55 and the sealed in annular space 51 evacuated via a suction channel 56. As shown in FIG. 9 the radial rod 55 is positioned down the axis of the suction channel 56.

It is also possible to introduce an inert gas into the sealed off annular space, in order to prevent the formation of oxide.

Next, the main ram 13 presses the ingot 21 in the container 3 in the direction x through the extrusion die 7, while the container 3 moves towards the platen 1.

When the container 3 reaches its end point near the platen 1, then the ingot has been extruded up to the above mentioned disc-like butt 23, which projects out from the front 12 of the container 3 after the main ram 13 has moved back to its starting position as shown in FIG. 1, since this front 12 is again in line with the face 11 of the die 7.

A push from the charging device 20 is sufficient to free the ingot butt 23, the central hole 34 in which, in the examples chosen, is produced by the cylindrical projection 16 on the main ram 13.

We claim:

1. An improved extruding device for extruding sections from ingots and in particular light metal ingots such as aluminum or the like comprising:

container means, said container means having a hollow center extending therethrough along a first axis; shaping die means located in part within said hollow center;

ram means having an axis substantially parallel to and in line with said first axis, said ram means including a pressure plate provided with a working face;

wherein said shaping die means and said working face each include deformation means for deforming the end faces of said ingot so as to form an edge on the outer periphery of said end faces which continuously seals against the surface of the container defining said hollow center; and wherein said container is provided with means for removing air trapped between said ingot and said surface of said container defining said hollow center.

2. An extruding device according to claim 1 wherein said deformation means comprises a conical shaped depression.

3. An extruding device according to claim 1 wherein said deformation means comprises a ring-like projection.

4. An extruding device according to claim 1 wherein said deformation means on said shaping die means comprises a conical shaped depression and said deformation means on said working face comprises a ring-like projection.

5. An extruding device according to claim 1 further including scalping means for removing the outer layer of said ingot and moving means for moving said scalping means and said ingot relative to the other.

6. An extruding device according to claim 5 wherein said scalping means comprises a plurality of scalping blades each having a cutting surface, at least one of said scalping blades being moved by said moving means radially with respect to said first axis from a first position wherein said cutting surfaces of said blades are discontinuous to a second position wherein said cutting surfaces are continuous and substantially the same size as said hollow center.

7. An extruding device according to claim 6 wherein said cutting blades are in the shape of an arc.

8. An extruding device according to claim 7 wherein said container further includes means for moving said blades relative to said ingot.

9. An extruding device according to claim 1 wherein said deformation means on said shaping die means comprises a ring-like projection and said deformation means on said working face comprises a conical shaped depression.